United States Patent
Cox et al.

(10) Patent No.: US 7,164,692 B2
(45) Date of Patent: Jan. 16, 2007

(54) APPARATUS AND METHOD FOR TRANSMITTING 10 GIGABIT ETHERNET LAN SIGNALS OVER A TRANSPORT SYSTEM

(76) Inventors: Jeffrey Lloyd Cox, 280 Paddock Trail, Fairview, TX (US); Samir Satish Sheth, 4520 Turnberry Ct., Plano, TX (US) 75024

( * ) Notice: Subject to any disclaimer, the term of this patent is extended or adjusted under 35 U.S.C. 154(b) by 164 days.

(21) Appl. No.: 10/357,606

(22) Filed: Feb. 4, 2003

(65) Prior Publication Data

US 2004/0028408 A1 Feb. 12, 2004

Related U.S. Application Data

(60) Provisional application No. 60/370,826, filed on Apr. 8, 2002.

(51) Int. Cl.
*H04J 3/16* (2006.01)
*H04J 3/22* (2006.01)

(52) U.S. Cl. .................... 370/466; 370/503
(58) Field of Classification Search ........ 370/400–408, 370/465–474
See application file for complete search history.

(56) References Cited

U.S. PATENT DOCUMENTS

| | | | |
|---|---|---|---|
| 4,229,831 A | 10/1980 | Lacher | |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,455,703 A | 10/1995 | Duncan et al. | |
| 5,559,625 A | 9/1996 | Smith et al. | |
| 5,613,210 A | 3/1997 | Van Driel et al. | |
| 5,726,784 A | 3/1998 | Alexander et al. | |
| 5,737,118 A | 4/1998 | Sugaya et al. | |
| 5,778,116 A | 7/1998 | Tomich | |
| 5,790,285 A | 8/1998 | Mock | |
| 5,812,290 A | 9/1998 | Maeno et al. | |
| 5,877,881 A | 3/1999 | Miyauchi et al. | |
| 5,903,613 A | 5/1999 | Ishida | |
| 5,914,794 A | 6/1999 | Fee | |

(Continued)

FOREIGN PATENT DOCUMENTS

EP 1 191 756 A2 * 3/2002

(Continued)

*Primary Examiner*—Huy D. Vu
*Assistant Examiner*—Daniel Ryman
(74) *Attorney, Agent, or Firm*—Woodcock Washburn LLP (57) ABSTRACT

A computer system and method for transmitting 10 Gigabit Ethernet (10GE) LAN signals over transport systems. Standard 10GE LAN signals are generated in any client IEEE 802.3 10GE LAN compliant interface. A transceiver receives the client 10GE LAN signal in the LAN format. The client 10GE LAN signals are not converted to a SONET transmission format at any time before reaching the transceiver. The transceiver then converts the client 10GE LAN signal to an internal electrical 10GE LAN signal before re-clocking the internal electrical LAN signal. The re-clocked internal electrical 10GE LAN signal is then re-modulated into a second 10GE LAN signal. The second 10GE LAN signal is then transmitted to a transport system.

30 Claims, 6 Drawing Sheets

U.S. PATENT DOCUMENTS

| | | | |
|---|---|---|---|
| 5,914,799 A | 6/1999 | Tan | |
| 5,936,753 A | 8/1999 | Ishikaawa | |
| 5,940,209 A | 8/1999 | Nguyen | |
| 5,963,350 A | 10/1999 | Hill | |
| 5,995,694 A | 11/1999 | Akasaka et al. | |
| 6,005,702 A | 12/1999 | Suzuki et al. | |
| 6,021,245 A | 2/2000 | Berger et al. | |
| 6,038,062 A | 3/2000 | Kosaka | |
| 6,075,634 A * | 6/2000 | Casper et al. | 398/139 |
| 6,078,414 A | 6/2000 | Iwano | |
| 6,081,360 A | 6/2000 | Ishikawa et al. | |
| 6,084,694 A | 7/2000 | Milton et al. | |
| 6,088,152 A | 7/2000 | Berger et al. | |
| 6,108,074 A | 8/2000 | Bloom | |
| 6,122,095 A | 9/2000 | Fatehi | |
| 6,151,334 A | 11/2000 | Kim et al. | |
| 6,157,477 A | 12/2000 | Robinson | |
| 6,160,614 A | 12/2000 | Unno | |
| 6,163,392 A | 12/2000 | Condict et al. | |
| 6,163,636 A | 12/2000 | Stentz et al. | |
| 6,173,094 B1 | 1/2001 | Bowerman et al. | |
| 6,177,985 B1 | 1/2001 | Bloom | |
| 6,198,559 B1 | 3/2001 | Gehlot | |
| 6,229,599 B1 | 5/2001 | Galtarossa | |
| 6,236,481 B1 | 5/2001 | Laor | |
| 6,236,499 B1 | 5/2001 | Berg et al. | |
| 6,246,510 B1 | 6/2001 | BuAbbud et al. | |
| 6,259,553 B1 | 7/2001 | Kinoshita | |
| 6,259,554 B1 | 7/2001 | Shigematsu et al. | |
| 6,259,693 B1 | 7/2001 | Ganmukhi et al. | |
| 6,259,845 B1 | 7/2001 | Sardesai | |
| 6,272,185 B1 | 8/2001 | Brown | |
| 6,275,315 B1 | 8/2001 | Park et al. | |
| 6,288,811 B1 | 9/2001 | Jiang et al. | |
| 6,288,813 B1 | 9/2001 | Kirkpatrick et al. | |
| 6,295,281 B1 * | 9/2001 | Itkowsky et al. | 370/293 |
| 6,307,656 B1 | 10/2001 | Terahara | |
| 6,317,231 B1 | 11/2001 | Al-Salameh et al. | |
| 6,317,255 B1 | 11/2001 | Fatehi et al. | |
| 6,323,950 B1 | 11/2001 | Kim et al. | |
| 6,327,060 B1 | 12/2001 | Otani et al. | |
| 6,356,384 B1 | 3/2002 | Islam | |
| 6,359,729 B1 | 3/2002 | Amoruso | |
| 6,388,801 B1 | 5/2002 | Sugaya et al. | |
| 6,396,853 B1 | 5/2002 | Humphrey et al. | |
| 6,519,082 B1 | 2/2003 | Ghera et al. | |
| 6,567,413 B1 * | 5/2003 | Denton et al. | 370/401 |
| 6,587,236 B1 * | 7/2003 | Butler et al. | 398/12 |
| 6,654,383 B1 | 11/2003 | Haymes et al. | |
| 6,678,527 B1 * | 1/2004 | Rasanen | 455/450 |
| 6,782,009 B1 * | 8/2004 | Giorgetta et al. | 370/539 |
| 2001/0005271 A1 | 6/2001 | Leclerc et al. | |
| 2001/0007605 A1 | 7/2001 | Inagaki et al. | |
| 2001/0009468 A1 | 7/2001 | Fee | |
| 2001/0014104 A1 | 8/2001 | Bottorff et al. | |
| 2002/0012152 A1 | 1/2002 | Agazzi et al. | |
| 2002/0015220 A1 | 2/2002 | Papernyl et al. | |
| 2002/0034197 A1 | 3/2002 | Tornetta et al. | |
| 2002/0044317 A1 | 4/2002 | Gentner et al. | |
| 2002/0044324 A1 | 4/2002 | Hoshida et al. | |
| 2002/0048287 A1 | 4/2002 | Silvers | |
| 2002/0051468 A1 | 5/2002 | Ofek et al. | |
| 2002/0063948 A1 | 5/2002 | Islam et al. | |
| 2002/0064181 A1 | 5/2002 | Ofek et al. | |
| 2002/0075903 A1 | 6/2002 | Hind | |
| 2002/0080809 A1 | 6/2002 | Nicholson et al. | |
| 2002/0131115 A1 * | 9/2002 | Kasahara | 359/124 |
| 2003/0161351 A1 * | 8/2003 | Beverly et al. | 370/535 |
| 2004/0109465 A1 * | 6/2004 | Kim et al. | 370/419 |

FOREIGN PATENT DOCUMENTS

| | | |
|---|---|---|
| JP | 01115230 | 5/1989 |
| JP | 02238736 | 9/1990 |

* cited by examiner

FIG. 2A — Layer 3 Router Approach
FIG. 2B — Layer 2 Switch Approach

10 GE LAN Transceiver

FIG. 4
Line Optics Module

Serial Transport System Architectures

FIG. 5A REPEATER

FIG. 5B REGENERATOR

FIG. 6
10 GE LAN Regenerator

APPARATUS AND METHOD FOR TRANSMITTING 10 GIGABIT ETHERNET LAN SIGNALS OVER A TRANSPORT SYSTEM

CROSS-REFERENCE TO RELATED APPLICATIONS

This application claims priority to Provisional Application Ser. No. 60/370,826, entitled "Apparatus and Method for Transmitting 10 Gigabit Ethernet LAN Signals Over a Long Haul DWDM System", by Jeffrey Lloyd Cox and Samir Satish Seth, filed Apr. 8, 2002.

FIELD OF THE INVENTION

This invention relates to a computer system for transmitting a 10 Gigabit Ethernet local area network (LAN) signal over a transport system without encapsulating the 10GE LAN signal into a Synchronous Optical Network (SONET) frame.

BACKGROUND OF THE INVENTION

Data networks that cover large geographical distances have historically been fundamentally different from those that cover short distances. This fact primarily was derived from the different evolutionary paths that were followed by the Enterprise networks (ones that reside inside of a business, home, educational institution, or government agency) and the Carrier networks (ones that are provided by a common carrier). Over the past few decades the Enterprise networks and Carrier networks mostly evolved independently, each addressing a different problem and each following a different set of standards. The Enterprise networks mostly evolved to support data from computing environments via LAN infrastructures and data protocols. After decades of competition between different LAN standards and networking protocols during the 1980s and 1990s, the LANs are now predominantly built on Ethernet and Internet Protocol (IP) technologies. Ethernet is defined by the Institute for Electrical and Electronics Engineers (IEEE) and specifically is defined by the IEEE 802.3 standard. The Internet Engineering Task Force (IETF) defines IP.

The Carrier networks mostly evolved to support voice services from home and business customers via various circuit-switched Time Domain Multiplexing (TDM) technologies. The Carrier networks are now predominantly comprised of various TDM technologies built on the Synchronous Optical Network (SONET) standard or its European counterpart Synchronous Digital Hierarchy (SDH). The American National Standard Institute (ANSI) defines SONET and the International Telecommunications Union (ITU) defines the SDH standard.

Historically, the Ethernet LAN technologies provided very cost-effective high-speed "local" connections among computers, but sacrificed the ability to span distances longer than approximately 10 km. Typical Ethernet LANs spanned relatively small areas like a building or a campus. More recently, Ethernet has been used directly over optical fiber in Metropolitan Area Networks (MANs) to deliver Ethernet services natively to areas on the order of 100 km in diameter. The method on how to utilize Ethernet natively on optical fiber for distances shorter than approximately 100 km is specified by the IEEE 802.3 standard.

As the need arose for the Enterprise LAN networks to interconnect their geographically separate facilities, the only available services at the Enterprise's disposal were from the public Carriers' networks. However, the asynchronous, connectionless, packet-oriented nature of the LAN technology was mostly incompatible with the synchronous, connection-based, bit-oriented nature of the Carriers' TDM facilities. To join the two technological worlds together, various data technologies were invented. In the realm where speeds are comparable to that of LANs (i.e. 10 Megabits/second or greater) Asynchronous Transfer Mode (ATM), Frame Relay (FR), and Packet over SONET (POS) became the most popular data technologies that Carriers utilized. ATM, FR, and POS are generally considered Wide Area Networking (WAN) technologies and are built on top of the SONET-based TDM infrastructure currently deployed by the carriers. In general, ATM, FR, and POS sacrificed the simplicity, efficiency, and cost-effectiveness of LAN technologies in order to be compatible with the existing carrier TDM infrastructure, which was primarily designed for voice traffic. At the time ATM, FR, and POS were being developed in the late 1980s, it made sense to make these sacrifices because the volume of data traffic over the TDM infrastructure was insignificant when compared to the volume of voice traffic. However, since the later part of the 1990's, data traffic has grown exponentially so that now it comprises the majority of the traffic on the Carrier's TDM infrastructure.

Since Carriers adopted ATM, FR, and POS as the WAN technologies, Enterprise networks were forced to utilize these inefficient and expensive technologies to interconnect their LANs between their various locations. Typically the interconnections were accomplished via routers with ATM, FR, and POS interfaces and ATM switches, see FIG. 1. The introductions of these WAN technologies to the Enterprise's LAN infrastructures lead to significant new technological learning curves and significant capital and operational expenses. Many Enterprises created entirely separate departments to deal with the Carriers and their WAN technologies.

As the Ethernet LAN technologies evolved, data rates grew from 10 Mbits/sec to 100 Mbits/sec, 1 Gbit/sec, and now 10 Gbit/sec Ethernet (10GE). Each successive generation of Ethernet remained compatible with the previous, thus allowing for interoperability as the network grew. Enterprises quickly adopted each new generation of Ethernet technology to support the exploding traffic volumes on their LANs. With the introduction of 10GE standard, Enterprise networks will once again scale to the next level. The high throughput rate of 10GE makes the technology extremely attractive for use on corporate backbone networks. Because the original packet format and minimum/maximum packet size were retained between the various versions of Ethernet, all forms of Ethernet interoperate seamlessly. Consequently it is possible, for example, to collect traffic from one hundred 100 Base-T Ethernets, each running at full speed, and pass this traffic along a single 10GE network.

However, the Carrier WAN technologies have lagged behind the LAN Ethernet implementations in terms of capacity, price/performance, and ease of use. Enterprises have voiced their desire to implement Ethernet connections across WANs as a mechanism to supplant the traditional WAN technologies (ATM, FR, and POS) offered by Carriers. There are several potential mechanisms available to transport the various Ethernet technologies across WAN infrastructures. In general, these mechanisms can be broken into two categories: encapsulation and native. In the case of encapsulation, an Ethernet frame is removed from its native media format and encapsulated inside of the payload area of another protocol. There are numerous examples of the encapsulation approach including: Ethernet over FR, Ethernet over POS, Ethernet over SONET (x86, 10GE WAN, and others), and Ethernet over ATM (LANE). All of these encapsulation techniques were invented in order to allow Ethernet to be run over existing Carrier WAN technologies that, in turn, were transported on top of traditional Carrier TDM technologies, thus creating additional unnecessary layers of cost and complexity. The native Ethernet formats are defined by the IEEE 802.3 committee standards for each of the Ethernet variations. The physical layer (PHY) of the IEEE Ethernet standards defines how Ethernet is transmitted over a given media. For each of the Ethernet speeds (10 Mb, 100 Mb, 1 Gb, and 10 Gb) the IEEE defines at least one native PHY format that transports Ethernet directly on optical fiber facilities and at least one PHY format that transports Ethernet directly on copper facilities (coax or twisted pair media). In addition to various copper-based PHYs, each of the Ethernet speeds support multiple PHYs for optical fiber in order to support different reaches, different price points, and different optical fiber types. However, the IEEE-defined PHYs do not support:

1. Reaches beyond about 100 km
2. Optical media other than optical fiber
3. Media other than optical fiber or copper
4. Multiplexing multiple Ethernet signals over a given optical media.

The 100 km limit on optical fiber is the approximate point at which an optical signal will degrade beyond the point of recovery without some form of signal regeneration. The IEEE 802.3 committee's charter ended at this point as they saw that distances beyond 100 km were in the realm of WAN technologies and they were a committee chartered to focus on LAN issues.

When developing the 10GE standard, the IEEE 802.3ae committee developed two different 10GE frame formats. These frame formats are generally known as the "LAN" standard and the "WAN" standard, though these are somewhat misnamed terms. The 10GE "LAN" standard utilizes a native frame format identical to all previous IEEE 802.3 Ethernet standards. But, in order to allow compatibility with the existing SONET framing structure and data rate, the IEEE 802.3ae committee defined the 10GE "WAN" standard. The IEEE 802.3ae WAN standard encapsulates native Ethernet frames inside of an OC-192 SONET Payload Envelope (SPE) and adjusts the clock rate of the 10GE signal such that it is compatible with that of OC-192. Both the 10GE WAN and 10GE LAN standards support the same set of optical fiber PHYs and thus both have the same distance limitations on a single span of optical fiber without resorting to additional equipment. The "LAN" and "WAN" designations simply refer to their differences in framing format and data rates.

To transport native Ethernet signals further than the nominal 100 km limit on optical fiber, and/or to support multiple optical Ethernet signals natively on a given optical fiber, other technologies must be introduced to multiplex, amplify, and condition the optical signal. The technologies that allow optical signals to cost-effectively travel beyond 100 km and/or be multiplexed on optical fiber are well known and have been applied to the SONET industry for well over a decade. These technologies include: optical amplification (via Erbium Doped Fiber Amplifiers (EDFA) or Raman amplifiers), dispersion compensation, optical multiplexing via Coarse Wave Division Multiplexing (CWDM, less than 17 channels) or Dense Wave Division Multiplexing (DWDM, greater than or equal to 17 channels), gain equalization, Forward Error Correction (FEC), and various modulation techniques. Combined, these technologies are generally referred to as Metro (less than 100 km in length), Long Haul (LH, between 100 and 1000 km), and Ultra Long Haul (ULH, greater than 1000 km) transport systems. Recent ULH systems allow more than 100 ten-gigabit signals to be transmitted 1000's of kilometers over an optical fiber without the need to be converted to an electronic signal.

Transport systems are that class of systems that allow a signal (or signals) to be transmitted and received via a media while including functionality beyond that of the original signal. An optical transport system may include optical fiber or free space optics. Transport systems include support for functionality such as (but not limited to):

1. Media: optical fiber, Free Space Optics (FSO), Radio Frequency (RF), and electrical-based solutions (twisted copper pairs, coaxial cable)
2. Topological organizations: linear, rings, stars, and meshes
3. Switching capabilities: protection, restoration, and cross-connections
4. Multiplexing capabilities: single channel, CWDM, and DWDM
5. Directional capabilities: unidirectional or bi-directional
6. Distance capabilities: Metro, LH, ULH, submarine, and satellite systems
7. Transport system network elements: Optical Add/Drop Multiplexers (OADM), Optical Wavelength Cross-connects (OXC), and Regenerators (Regen)
8. Management and Control systems: signaling protocols, performance monitoring, and configuration and control interfaces These functionalities may be used independently or in various combinations to create a wide variety of transport system implementations to solve specific transport system problems.

In the prior art, to adapt a standard IEEE 802.3 10GE client signal to a format that is suitable for a specific transport system, a device called a transceiver is employed. A transceiver converts the 10GE signal from a client system (the tributary signal) to a signal that is defined by the particular transport system (the line signal). Prior art transceivers such as those offered by Nortel, Lucent, Hitachi and others are available to convert 850, 1310 and 1550 nm optical tributary signals compatible with the 10GE WAN standard to the signals suitable for their respective Metro/LH/ULH systems. However, a need exists in the industry for a transceiver that is capable of receiving tributary signals of the 10GE LAN standard. In other words, a need exists for a high-speed transport system that is compatible with the 10GE LAN standard and does not require conversion to the IEEE 10GE WAN standard, or any other SONET-based standard, for use in creating networks.

Prior art systems suffer from the ability of using the 10GE LAN standard for a high-speed transport system. For example, U.S. Pat. No.2001/0014104, to Bottorff, et al., entitled "10 Gigabit Ethernet Mappings For A Common Lan/Wan Pmd Interface With A Simple Universal Physical Medium Dependent Interface", discloses an Ethernet mapping that enables high speed Ethernet data streams having a data rate of 10 Gb/s to be transported across a synchronous packet switched network having a standard SONET OC-192 line rate. The Bottorff invention, as with many of the other prior art inventions, requires conversion to a SONET-based standard.

U.S. Pat. No. 6,075,634 to Casper, et al., entitled "Gigabit Data Rate Extended Range Fiber Optic Communication System And Transponder Therefor", discloses a method and system for a fiber optic digital communication system and associated transponder architecture. The system interfaces Gigabit Ethernet digital data over an extended range fiber optic link, using digital data signal regeneration and optical signal processing components that pre- and post-compensate for distortion and timing jitter. Casper does not disclose a transceiver that is capable of receiving tributary signals of the 10GE LAN standard.

U.S. Pat. No. 6,288,813 to Kirkpatrick, et al., entitled "Apparatus And Method For Effecting Data Transfer Between Data Systems", discloses a receiver that converts an optical signal to digital data signals. The digital data signals are then converted to balanced bipolar signals and are then outputted onto buses for input into data systems. Kirkpatrick does not disclose an architecture for transporting 10GE LAN signals.

SUMMARY OF THE INVENTION

The present invention is an improvement over the prior art because the invention provides a system and method for transmitting IEEE 10GE LAN signals over transport systems through a novel transceiver. Standard 10GE LAN tributary signals are generated by any IEEE 802.3 10GE LAN compliant client device or system. The transceiver receives the tributary 10GE LAN signal in its native format. The transceiver then converts the 10GE LAN signal to an internal electrical 10GE LAN signal and utilizes this signal to drive a second transport system signal (the line-side or line signal). The line-side 10GE LAN signal is then transmitted through the remainder of the transport system as a standard 10GE LAN signal with or without FEC.

The invention further provides for performance monitoring (PM) of the received tributary and line-side optical signals, termination of the tributary and line signals (both transmit and receive), conversion of the tributary and line signals to and from internal electrical signals, electrically multiplexing and de-multiplexing signals, adding and removing FEC, clock and data recovery (CDR) of received signals, and in the case of optical line-side signals, control of laser wavelength locking and modulation of line optics.

An exemplary use of the invention consists of the interconnection of two 10GE LAN client systems such as that known in the art. One example would be the Cisco Catalyst 6500 Ethernet switch with a 10GE LAN interface (the client interface). The Catalyst 10GE LAN interface is connected to an embodiment of the invention comprising of a 10GE LAN transceiver, which is in turn connected to a transport system. The transport system carries the 10GE LAN signal to the other end of the transport system where a second 10GE LAN transceiver coverts the signal to a second client signal that is attached to a second Catalyst 10GE LAN interface. Within each transceiver, the 10GE client signal is converted to and from an internal electrical signal via the PMD. The internal 10GE signal is performance monitored by a 10GE LAN Media Access Control (MAC) circuit. The internal 10GE signal is connected through a bus to and from a Forward Error Correction (FEC) circuit and subsequently to an electrical multiplexer (MUX) and from an electrical de-multiplexer (DMUX) where CDR is performed. The data from the electrical MUX is then communicated to a line optics module (LOM) in the transmitting direction of the line-side. The transmitting direction of the LOM consists of one or more drivers (electrical amplifiers) that modulate (either directly or via an external modulator) a laser contained in the LOM. The resulting modulated laser light is then placed onto the transport system. The receiving direction of the LOM consists of a detector and an electrical amplifier to boost the detected signal in the case where the detector's own electrical signal is insufficient to drive the remaining circuitry. Data from the electrical detector is then communicated to DMUX where CDR is performed and the signal is subsequently passed to the FEC circuit. The PMD, 10GE MAC, FEC circuit, MUX, DMUX, and LOM are all controlled from a central micro controller through a control bus.

All of the above advantages make a high-speed transport system that is compatible with the 10GE LAN standard and does not require conversion to the IEEE 10GE WAN standard, or any other SONET-based standard, for use in creating networks. This results in an increase of capacity, a better price/performance ratio, and a system that is easier to use and operate.

DETAILED DESCRIPTION OF THE DRAWINGS

A better understanding of the invention can be obtained from the following detailed description of one exemplary embodiment as considered in conjunction with the following drawings in which.

DETAILED DESCRIPTION OF EXEMPLARY EMBODIMENTS

In the descriptions that follow, like parts are marked throughout the specification and drawings with the same numerals, respectively. The drawing figures are not necessarily drawn to scale and certain figures may be shown in exaggerated or generalized form in the interest of clarity and conciseness. Reference of an A–Z signal or direction means from the left side of the drawing to the right side of the drawing while Z–A means from the right side to the left side. The A–Z or Z–A designation is used for illustrative purposes only.

Figures 1, 1A:
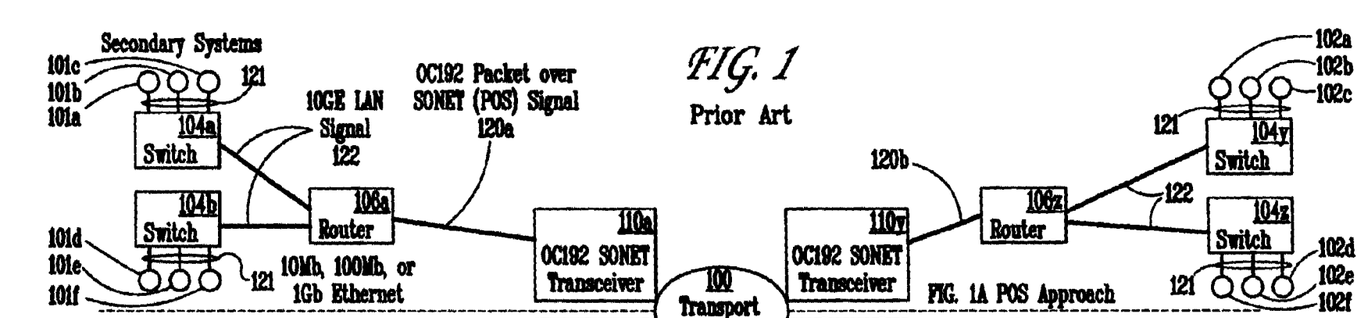
FIG. 1a is a block diagram depicting a transport system connecting multiple LANs according to the prior art POS approach.
Figure 1B:
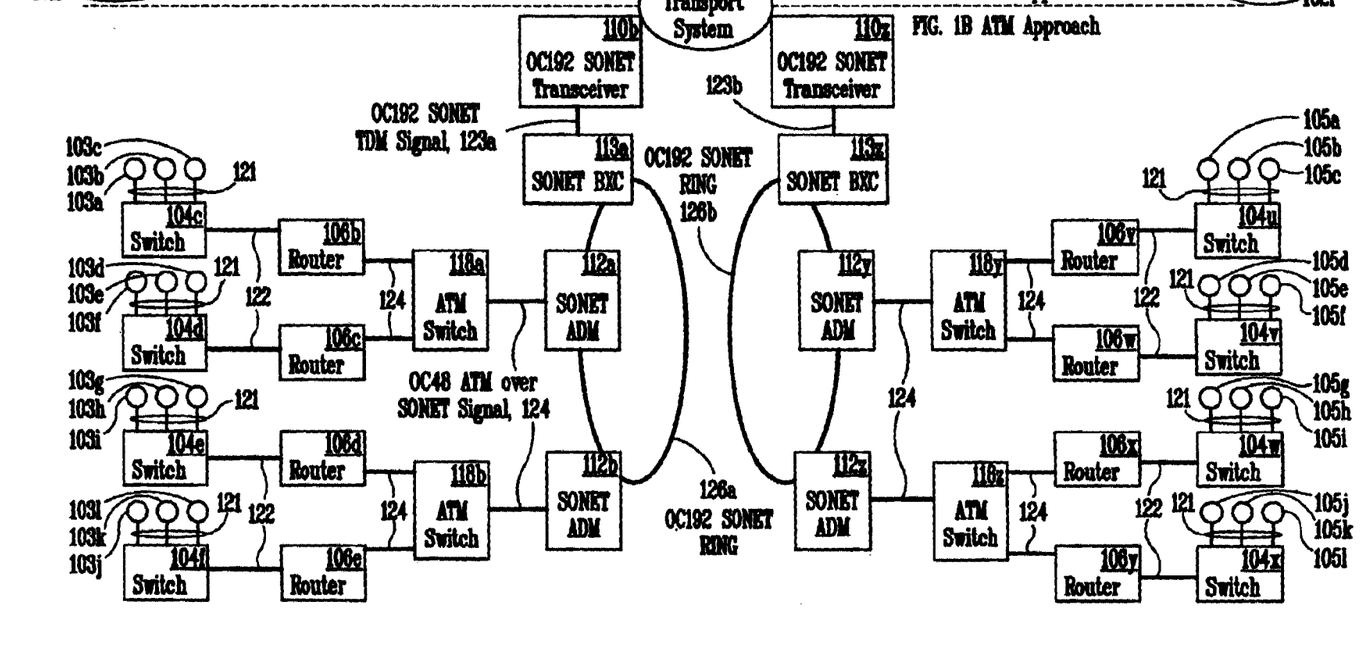
FIG. 1b is a block diagram depicting a transport system connecting multiple LANs according to the ATM approach.

FIG. 1 illustrates the block diagram of a transport system interconnecting multiple LANs according to the prior art. FIG. 1 illustrates two different typical prior art approaches: The POS approach (FIG. 1a) and the ATM approach (FIG. 1b). In both approaches, the transport system 100 is connected at both ends by OC 192 SONET transceivers 110a, 110b, 110y and 110z.

For the POS approach in FIG. 1a, Ethernet-based secondary systems 101a–f are connected to Ethernet switches 104a and 104b via Ethernet signals 121. Ethernet signals 121 may be 10 Mb, 100 Mb, or 1 Gb and are based on the IEEE 802.3 standard, herein incorporated by reference. Switches 104a and 104b are connected to router 106a via 10GE LAN signals 122. Router 106a is connected to transceiver 110a via OC 192 SONET POS signal 120a. Transceiver 110a is connected to transport system 100. Transport system 100 is connected to transceiver 100y. Transceiver 100y is connected to router 106z via POS signal 120b. Router 106z is connected to switches 104y and 104z via 10GE LAN signals 122. Switches 104y and 104z are connected to Ethernet-based secondary systems 102a–f via Ethernet signals 121.

The communications to and from secondary systems 101a–f through switches 104a and 104b and to router 106a occurs via Ethernet packets. To communicate over transport system 100, router 106a converts the standard Ethernet LAN packets existing on 10GE LAN signals 122 to POS signal 120a. The POS signal 120a frame format differs in form from the standard 10GE LAN signal 122 frame format and conversion is required from one to the other. Routers 106a and 106z communicate over POS signal 120a and 120b in a point-to-point fashion utilizing the POS protocol. The transceivers 110a and 110y at either end of the transport system 100 do not participate at the POS protocol level with the routers 106a and 106z and therefore the routers 106a and 106z appear to each other as if they are directly connected.

For the ATM approach in FIG. 1b, Ethernet-based secondary systems 103a–l are connected to switches 104c–f via Ethernet signals 121. Switches 104c–f are connected to routers 106b–e via 10GE LAN signals 122. Routers 106b–e are connected to ATM Switches 118a and 118b via OC48 ATM signals 124. ATM Switches 118a and 118b are connected to SONET Add/Drop Multiplexers (ADM) 112a and 112b via ATM signals 124. SONET ADMs 112a and 112b are connected to a SONET Broadband Cross-connect (BXC) 113a via an OC192 SONET ring 126a. BXC 113a is connected to transceiver 110b via an OC192 SONET TDM signal 123a. Transceiver 110b is connected to transport system 100. Transport system is connected to transceiver 110z. Transceiver 110z is connected to BXC 113z via TDM signal 123b. BXC 113z is connected to SONET ADMs 112y and 112z via SONET ring 126b. SONET ADMs 112y and 112z are connected to ATM Switches 118y and 118z by ATM signals 124. ATM switches 118y and 118z are connected to routers 106v–y via ATM signals 124. Routers 106v–y are connected to switches 104u–x via 10GE LAN signals 122. Switches 104u–x are connected to Ethernet-based secondary systems 105a–l via Ethernet signals 121.

The communications to and from the secondary systems 103a–l, Ethernet switches 104c–f, and routers 106b–e occurs via Ethernet packets. To communicate over transport system 100, routers 106b–e convert standard Ethernet LAN packets existing on 10GE LAN signals 122 to ATM signal 124. The ATM signal 124 frame format 124 differs in form from the standard 10GE LAN signal 122 frame format and conversion is required from one to the other. The standard ATM signal, 124 is switched via the ATM switches 118a and 118b and transported into ATM signal 124 time-slots on the SONET ring 126a by the ADMs 112a and 112b. The ATM signal 124 time slots on the SONET ring 126a are removed by the BXC 113a and are cross-connected onto ATM signal 124 time-slots on TDM signal 123a. TDM signal 123a is then placed onto transport system 100 by transceiver 110b.

Routers 106b–e and routers 106v–y can communicate with each other via standard ATM virtual circuits (VCs) that flow through the ATM switches 118a–b and 118y–z and are transported over the ADMs 112a–b and 112y–z, SONET ring 126a, BXC 113a and 113z, and transceivers 110b and 110z. The transceivers 110b and 110z, ADMs 112a–b and 112y–z, SONET rings 126a and 126b, BXC 113a and 113z, and TDM signal 123a and 123b do not participate at the ATM protocol level with the ATM switches 118a, 118b, 118y and 118z, and therefore the ATM switches 118a, 118b, 118y and 118z appear to each other as if they are directly connected. Additionally, the ATM switches 118a, 118b, 118y and 118z do not participate in the routing protocols run on the routers 106b–e and 106v–y and thus the routers 106b–e and 106v–y also appear as if they are directly connected to each other.

Figures 2, 2A, 2B:
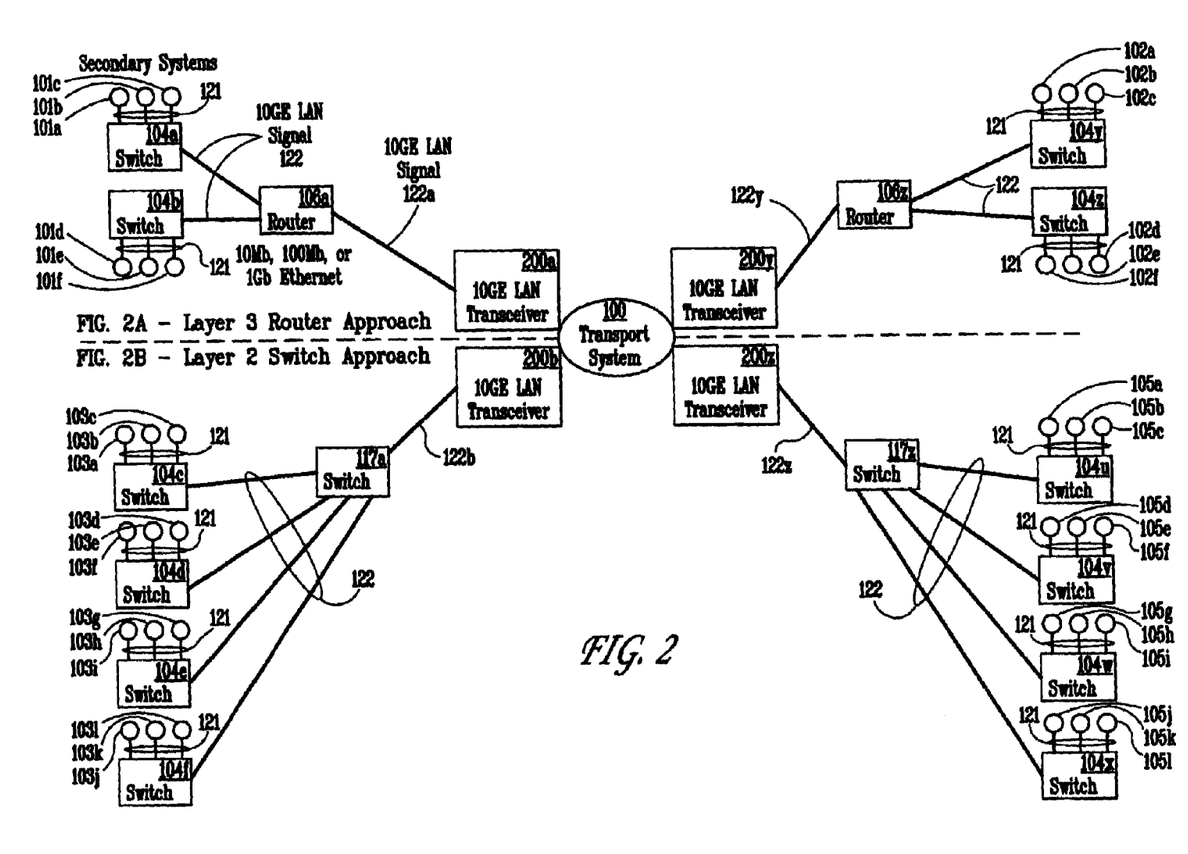
FIG. 2a is a block diagram depicting a transport system connecting multiple LANs according to the present invention in a layer 3 router approach.
FIG. 2b is a block diagram depicting a transport system connecting multiple LANs according to the present invention in a layer 2 switch approach.

FIG. 2 is a block diagram depicting a transport system interconnecting multiple LANs in accordance with the present invention. FIG. 2 illustrates two different approaches that could be utilized. FIG. 2a represents the layer 3 Router approach. FIG. 2b represents the Layer 2 Switch approach. In both approaches, the transport system 100 is connected to Ethernet networks by 10GE LAN transceivers 200a–b and 200y–z.

For the Layer 3 Router approach in FIG. 2a, secondary Ethernet systems 101a–f, as shown in the prior art system of FIG. 1a., are connected to switches 104a and 104b via Ethernet signals 121. Switches 104a and 104b are connected to router 106a via 10GE LAN signals 122. Router 106a is connected to 10GE LAN transceiver 200a via 10GE LAN signal 122a. 10GE LAN transceiver 200a is connected to transport system 100. Transport system 100 is connected to 10GE LAN transceiver 200y. 10GE LAN transceiver 200y is connected to router 106z via 10GE LAN signal 122y. Router 106z is connected to switches 104y and 104z via 10GE LAN signals 122. Switches 104y and 104z are connected to secondary systems 102a–f via Ethernet signals 121.

The standard 10GE LAN signal 122a is transmitted from the router 106a through the 10GE LAN transceiver 200a continuing through the transport system 100 through the 10GE LAN transceiver 200y and to the router 106z without conversion at the frame level, thus creating an end-to-end Ethernet infrastructure. Routers 106a and 106z are capable of supporting 10GE LAN signals 122a and 122y and such an interface is well known in the art and will not be further described here. The 10GE LAN signals 122 pass from the router 106z to switches 104y and 104z. The 10GE Ethernet LAN frame as defined in the IEEE 802.3 specification is not altered in transit through the transceiver or transport system.

For the Layer 2 Switch approach in FIG. 2b, secondary ethernet systems 103a–l are connected to switches 104c–f via Ethernet signals 121. Switches 104c–f are connected to the Layer 2 Ethernet switch 117a via 10GE LAN signals 122. Layer 2 Ethernet switch 117a is connected to 10GE LAN transceiver 200b via 10GE LAN signal 122b. 10GE LAN transceiver 200b is connected to transport system 100. Transport system 100 is connected to 10GE LAN transceiver 200z. 10GE LAN transceiver 200z is connected to the Layer 2 Ethernet switch 117z via 10GE LAN signal 122z. Layer 2 Ethernet switch 117z is connected to switches 104u–x via 10GE LAN signals 122. Ethernet switches 104u–x are connected to secondary systems 105a–l via Ethernet signals 121. The standard 10GE LAN signal 122b is transmitted from the Layer 2 Ethernet switch 117a through the 10GE LAN transceiver 200b, through the transport system 100 through the 10GE LAN transceiver 200z and to the Layer 2 Ethernet switch 117z without conversion at the frame level.

According to the present invention, the standard 10GE LAN signal 122a, 122b, 122y, and 122z are not converted to a standard SONET signal 120 prior to reception by transceivers 200a, 200b, 200y, and 200z. For example, the standard 10GE LAN signal 122b is transmitted directly from the Layer 2 Ethernet switch 117a through the 10GE LAN transceiver 200b without conversion to the standard ATM signals 124, standard SONET ring 126a or SONET TDM signal 123a as was required in the prior art system of FIG. 1b. 10GE LAN transceivers 200a, 200b, 200y, and 200z of FIG. 2 receive a standard 10GE LAN signal 122a, 122b, 122y, and 122z, not a SONET POS signal 120a or a SONET TDM signal 123a. Because conversions from the 10GE LAN signals to standard ATM signals and standard SONET ring and TDM signal are not required, ATM switches 118, SONET ADMs 112, and SONET BXCs 113 required by the prior art are not required in a network incorporating the present invention.

Figure 3:
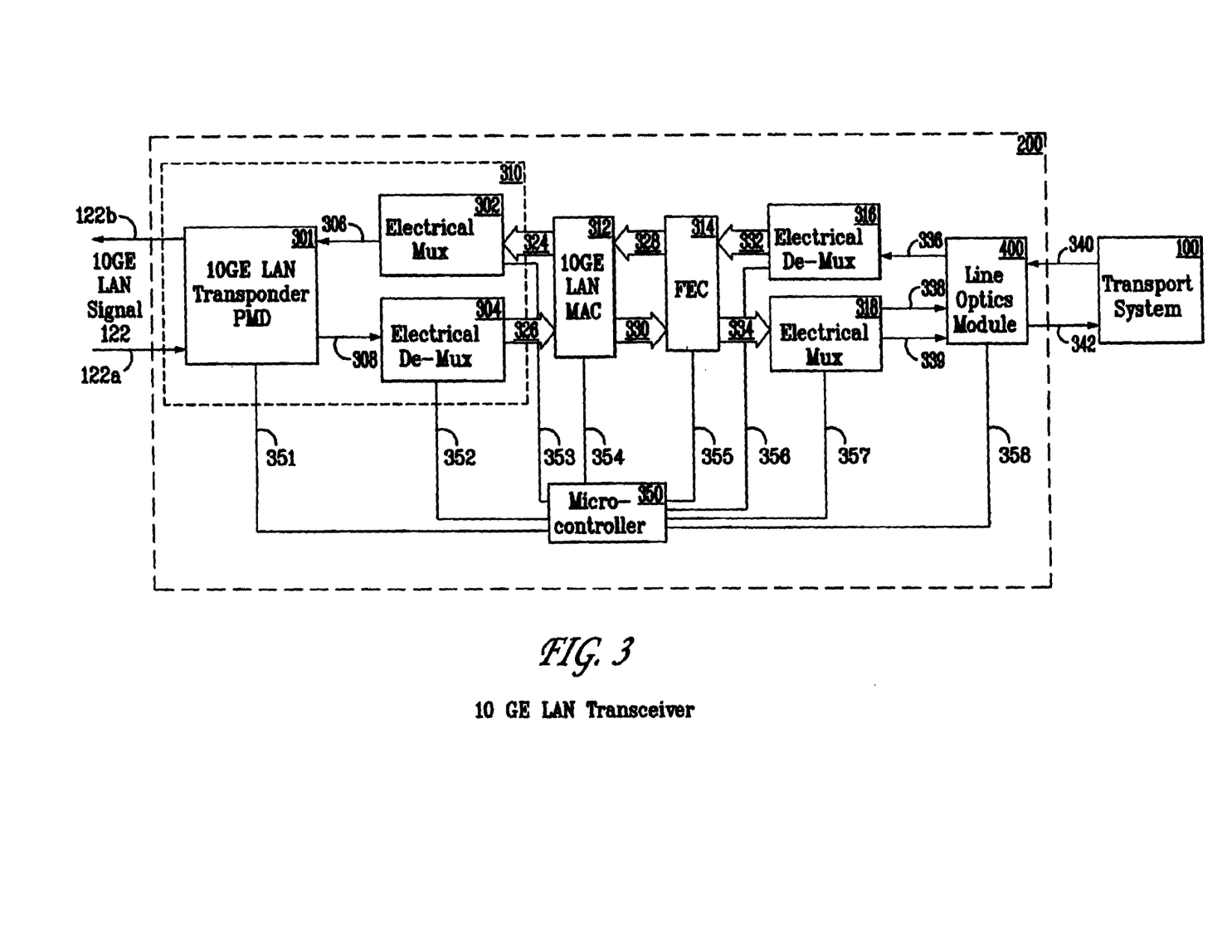
FIG. 3 is a block diagram of the 10GE LAN transceiver according to the present invention.

FIG. 3 is a block diagram of 10GE LAN transceiver 200. 10GE LAN transceiver 200 includes a physical medium device (PMD) 301 able to receive a 10GE LAN signal 122a and transmit a 10GE LAN signal 122b. The specifications for various PMDs for the 10GE LAN standard are defined in the IEEE 802.3 specification and are well known in the art. Laser temperature, laser current (optical PMDs) and "loss of signal" information is transmitted to micro-controller 350 from PMD 301 through control line 351 to monitor the performance of PMD 301. Also, the microcontroller 350 is able to control the PMD 301 through control line 351.

Upon receiving a 10GE LAN signal 122a, PMD 301 converts the standard 10GE LAN signal 122a into a standard electrical 10GE LAN signal 308. The electrical 10GE LAN signal 308 from PMD 301 is transmitted to an electrical de-multiplexer (De-Mux) chip 304. Standard electrical 10GE LAN signal 308 is transmitted by the PMD 301 at the same serial data rate 10.3125 Gb/sec as the standard 10GE LAN signal 122a and is defined by IEEE 802.3 standard. De-Mux 304 recovers clock and data information and divides the serial standard electrical 10GE LAN signal 308 into an intermediate 16-channel wide 10GE LAN signal 326 transmitted in parallel format to the 10GE LAN media access controller (MAC) chip 312. Status information such as bit error rate (BER) and chip identification are transmitted to micro-controller 350 from De-Mux 304 via line 352 as required to maintain optimal system performance. PMD 301 is also connected to an electrical multiplexer (Mux) 302 through serial standard 10GE LAN electrical signal 306. Mux 302 combines an intermediate 16-channel wide 10GE LAN signal 324 transmitted from the MAC 312 into a 10GE LAN serial signal at 10.3125 Gb/sec that is transmitted to PMD 301 through line 306. Mux 302 communicates with micro-controller 350 through line 353, transmitting status information and chip identification codes.

Transponder modules 310 that combine PMD 301, Mux 302 and De-Mux 304 are commercially available and typically identified as 10G Multi-Source Agreement (MSA) Transponder modules (300-pin or 200-pin), XenPak, Xpak, or XFP Transponder modules. Variations of the transponder modules 310 commercially exist to support a variety of media, optical fiber types, wavelengths, and reaches according to the IEEE 802.3 specification. An example MSA module 310 includes the Network Elements MiniPHY-300 that can be used to convert a 1310 nm optical signal to an electrical signal and convert an electrical signal to a 1310 nm optical signal. In addition, a wide variety of other commercially available transponder modules can also be implemented to accomplish this task. In the preferred embodiment, transponder module 310 may be changed before or during operation to accommodate various 10GE LAN client applications.

MAC 312 provides for a standard IEEE 802.3 10GE LAN MAC implementation as specified by the IEEE 802.3 standard. MAC 312 is used as a performance-monitoring device for the intermediate 10GE LAN signals 326 and 328. The MAC 312 monitors the packet data, idle, preamble and the remaining sections of the standard 10GE LAN signals as defined by the IEEE 802.3 standard. MAC 312 also identifies the total number of packets present, the total number of bytes present, performs cyclic redundancy checks (CRC) to detect errors in each packet, and performs numerous other packet monitoring functions as defined by the IEEE 802.3 standard. MAC 312 then communicates this performance monitoring information to micro-controller 350 via line 354. The micro-controller 350 also uses line 354 to instruct MAC 312 to be configured in such a way that the intermediate 10GE LAN signals 326 and 328 pass through MAC 312 unmodified while the performance monitoring information is extracted. Further, micro-controller 350 is able to receive copies of 10GE LAN frames from MAC 312 via line 354.

Micro-controller 350 utilizes the performance monitoring information to report how the 10GE LAN signal is performing. In one embodiment, micro-controller 350 polls line 354 extracting the number of packet errors. If certain thresholds are crossed, then an error is reported to the management system indicating a problem exists. If the errors reach a critical level, then microcontroller 350 can shut down the 10GE LAN signals 122 to prevent promulgation of errors.

The MAC 312 transmits the standard electric intermediate 10GE LAN signal 330 to the Forward Error Correction (FEC) device 314. FEC 314 is a device known in the art and performs the function of adding or deleting redundant information to the input bit pattern to allow it to be encoded and decoded to successfully eliminate errors resulting from transmission over the transport system 100. The FEC is not required for the functionality of the invention but is incorporated in the preferred embodiment for optimal performance. FEC 314 is in communication with Mux 318 via signal 334. As the signal is passed from MAC 312 through FEC 314 to Mux 318, FEC 314 adds extra data to the bit pattern contained in 10GE LAN signal 330 to allow for the recovery of potentially damaged bits in 10GE LAN signal 330 after 10GE LAN signal 330 has been transmitted over transport system 100. FEC 314 divides 10GE LAN signal 330 into predetermined sizes or frames and adds redundant information to the frames before transmission to Mux 318 via 10GE LAN signal 334.

In the reverse direction, FEC 314 receives FEC-wrapped frames over 10GE LAN signal 332 from De-Mux 316 and utilizes the redundant FEC information to correct data errors up to the FEC algorithm's limit. If the errors exceed the algorithm's limit, FEC 314 notes that the frame's errors were unrecoverable and reports the unrecoverable frame error to micro-controller 350 through line 355. If the FEC frame's errors are within the FEC algorithm's limit, FEC 314 corrects the frame, extracts the original 10GE LAN signal and transmits the corrected signal to MAC 312 via intermediate 10GE LAN signal 328 for further processing.

Mux 318 combines the parallel signals of the 10GE LAN signal 334 into a serial clock signal 339 and a phase shifted serial data signal 338. Mux 318 communicates statistics and chip identification codes to micro-controller 350 through line 357. The serial clock signal 339 and serial data signal 338 are then transmitted to line optics module (LOM) 400.

LOM 400 converts the serial data signal 338 and the serial clock signal 339 into optical signal 342. Optical signal 342 has a specific wavelength suitable for transmission over the transport system 100. LOM 400 reports measurements on laser drive current, laser bias voltage, and other parameters to micro-controller 350 through line 358.

The above describes an A–Z signal, for a Z–A signal LOM 400 receives incoming optical signal 340 from the transport system 100. LOM 400 converts optical signal 340 into a serial FEC-wrapped 10GE LAN electrical signal 336. The FEC-wrapped 10GE LAN electrical signal 336 is then transmitted to De-Mux 316. De-Mux 316 recovers clock and data information from 10GE LAN electrical signal 336 and divides the serial standard electrical 10GE LAN signal 336 into an intermediate 16-channel wide 10GE LAN signal 332 transmitted in parallel format to FEC 314. De-Mux 316 communicates with micro-controller 350 through line 356 on the presence or absence of a usable signal and the BER of the 10GE LAN electrical signal 336.

FEC 314 performs error correction as is described above and transfers the intermediate 10GE LAN signal 328 to MAC 312. MAC 312 monitors the performance of the intermediate 10GE LAN signal 328 as previously described and transparently passes the intermediate 10GE LAN signal 328 via signal 324 to Mux 302. Mux 302 recombines signal 324 into a serial standard 10GE LAN electrical signal 306 that is then transmitted to the PMD 301. PMD 301 converts the standard electrical 10GE LAN signal 306 to a standard 10GE LAN signal 122*b* as defined in the IEEE 802.3 standard, and sends standard 10GE LAN signal to router 106*a* or switch 117*a* depending on the architecture of the system.

Figure 4:
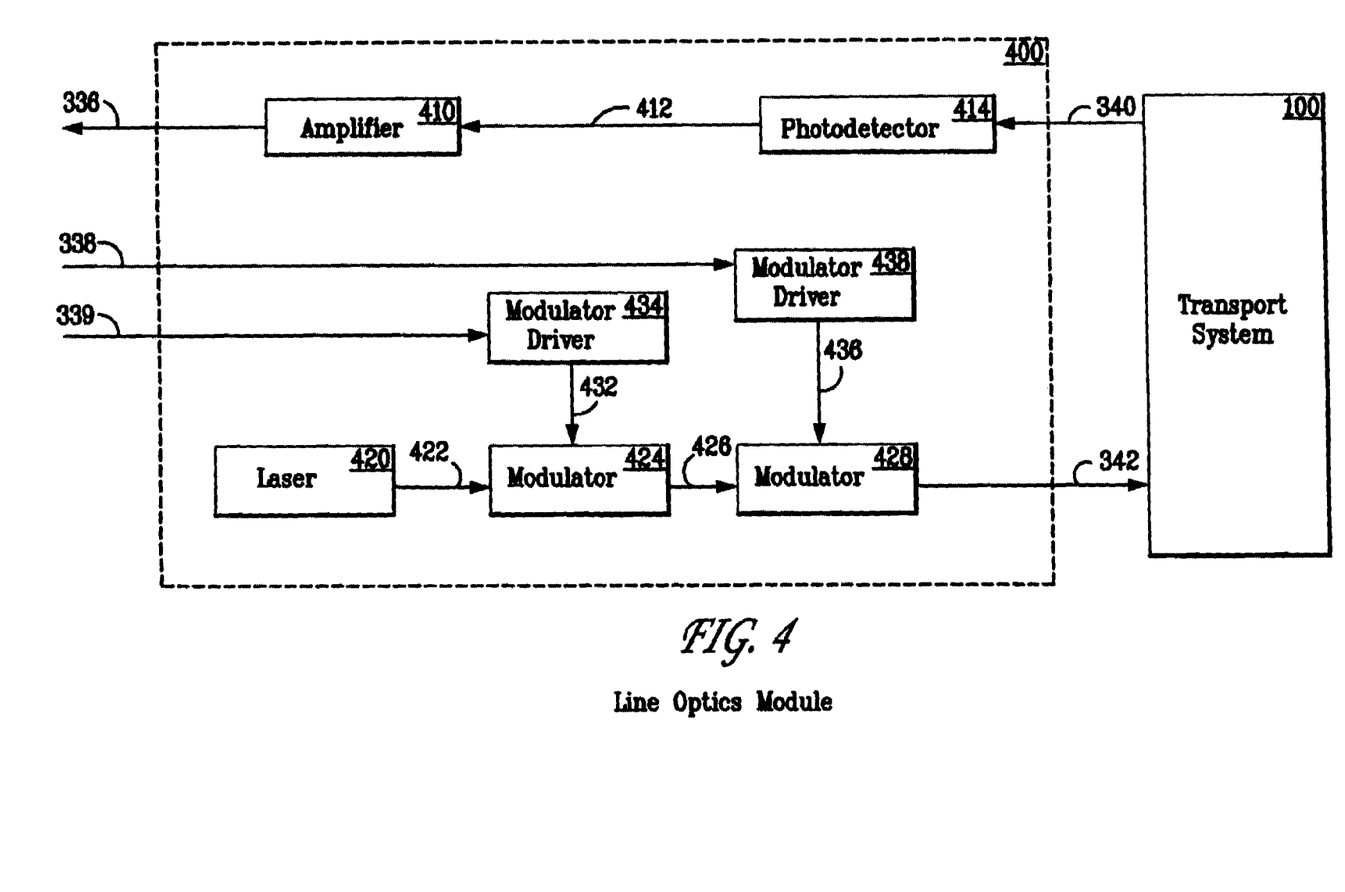
FIG. 4 is a block diagram depicting a LOM according to the present invention.

FIG. 4 is a block diagram of LOM 400 according to the present invention. In LOM 400, in the direction of a Z–A, an optical FEC-wrapped 10GE LAN signal 340 that has been transmitted over a transport system 100 is received by photo detector 414. Photo detector 414 converts the optical FEC-wrapped 10GE LAN signal 340 to an electrical voltage signal 412. Voltage signal 412, in the range of 50 milli-volts, is then transmitted to amplifier 410 where the voltage of the signal is increased to a range of 500 milli-volts. Some models of photo detectors supply adequate voltage on signal 412 so the amplifier 410 may not be required. After the voltage in signal 412 has been increased by amplifier 410, 10GE LAN electrical signal 336 is sent from the LOM 400 to the De-Mux 316 (as shown in FIG. 3).

In the LOM 400, in the direction of A–Z, serial clock signal 339 from Mux 318 is sent to a modulator driver 434. Serial clock signal 339 may be on the order of 500 milli-volts. Also, serial data signal 338 from Mux 318 is sent to a second modulator driver 438. Serial data signal 338 may also be on the order of 500 milli-volts.

A continuous-wave laser 420 is provided to generate laser optical signal 422 with an optical power on the order of 20 milli-watts. Laser 420 is locked to a specific frequency and temperature to produce a specific wavelength on laser optical signal 422. According to the present invention, a wavelength of 1520 to 1620 nanometers is desired with an accuracy of 0.01 nanometers. However, a wide variety of wavelengths and spectral widths can be implemented without detracting from the spirit of the invention. The laser optical signal 422 is sent to modulator 424.

In addition to receiving the laser optical signal 422, modulator 424 also receives a clock driver signal 432 from modulator driver 434. Clock driver signal 432 may be on the order of 12 volts. The modulator 424 modulates the laser optical signal 422 in accordance with the clock driver signal 432. The clock-modulated optical signal 426 is then transmitted to a second modulator 428. In addition to the clock-modulated optical signal 426, second modulator 428 also receives a phase-shifted data input signal 436 from second modulator driver 438. Phase-shifted data input signal 436 maybe on the order of 8-volts. Second modulator 428 modulates the clock-modulated optical signal 426*a* second time in accordance with phase-shifted data input signal 436. The double-modulated optical signal 342 is then transmitted from the LOM 400 to transport system 100. While FIG. 4 shows the laser is externally modulated, the laser may also be internally modulated.

Figure 5A:
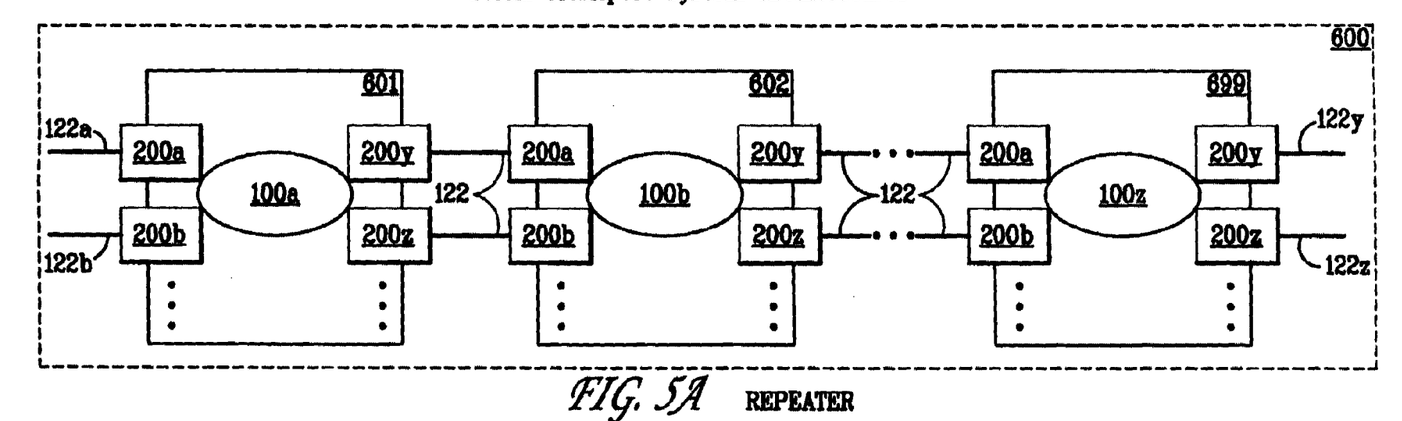
FIG. 5 is a block diagram depicting two variations of transport systems serially connected to one another according to the present invention.
Figure 5B:
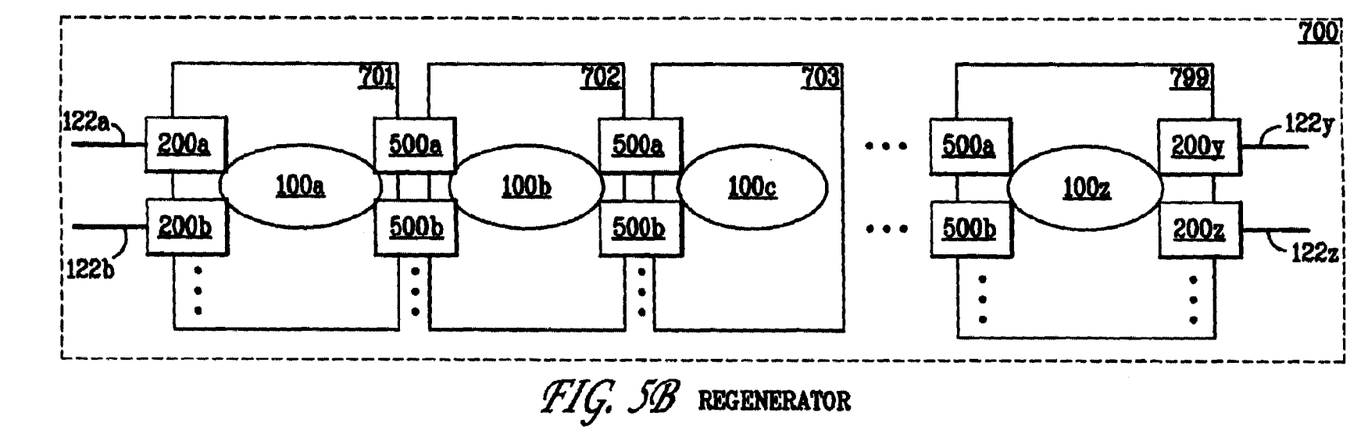

FIG. 5*a* and *b* are block diagrams depicting the use of the invention in two architectural approaches to extend the reach of a transport system 100. Other architectural approaches can be utilized without detracting from the spirit of the invention.

In serial transport system architecture 600, shown in FIG. 5*a*, separate 10GE LAN transport systems 601, 602, and 699 are each equipped with one or more 10GE LAN transceivers 200*a*, 200*b*, 200*y* and 200*z*. The transceivers 200*a*, 200*b*, 200*y* and 200*z* are operationally connected to a combination of transport systems 100*a–z* and regenerators 500*a* and 500*b* in an alternating arrangement. The ellipsis in the drawing indicates that there could be any number of reiterations of the architecture between 602 and 699. The overall system reach of the 10GE LAN signals is extended by serially connected adjacent 10GE LAN transceivers (200*a*/200*y* and 200*b*/200*z*) to form a continuous signal path for one or more 10GE LAN signals. By orientating transceivers 200*a*, 200*b*, 200*y* and 200*z* in such a manner, they act as repeaters.

In the A–Z direction, 10GE LAN signal 122*a* is received by transceiver 200*a*, transmitted over transport system 100*a*, and received by transceiver 200*y*. Transceiver 200*y* then sends 10GE LAN signal 122 to a second transceiver 200*a* to be transmitted over second transport system 100*b*. By transceiver 200*y* sending 10GE LAN signal 122 to transceiver 200*a* to be transmitted over a transport system the overall system reach of the 10GE LAN signals is extended. The process of serially connecting adjacent 10GE LAN transceivers continues until the desired distance is reached. Any number of transport systems 100 can be serially interconnected with pairs of 10GE LAN transceivers 200. Just as transceivers 200*a* and 200*y* can be serially connected to regenerators 500*a* in the A–Z direction, transceivers 200*b* and 200*z* can be serially connected to regenerators 500*b* in the Z–A direction as is shown in FIG. 5.

Figure 6:
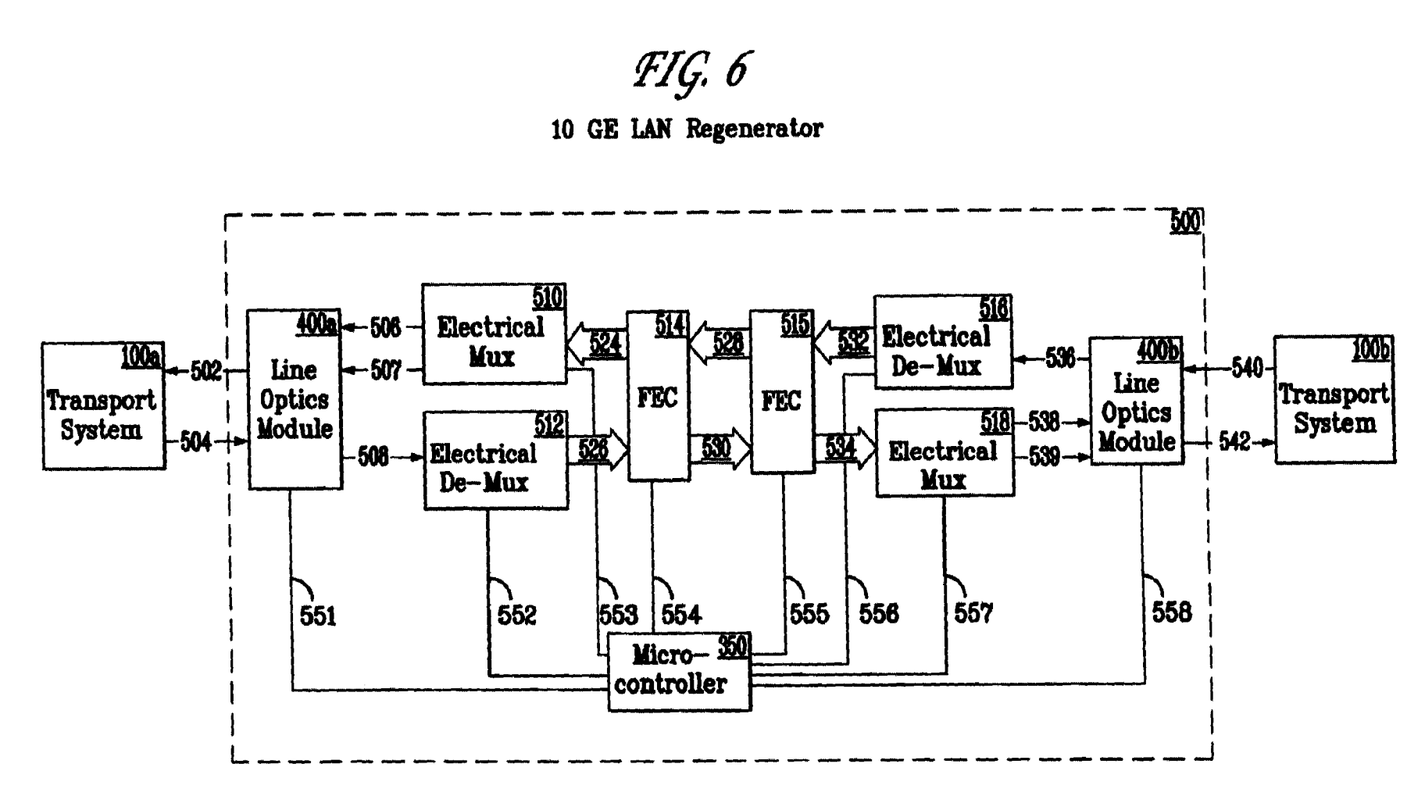
FIG. 6 is a block diagram depicting a 10GE LAN regenerator according to the present invention.

FIG. 6 is a block diagram of the 10GE LAN regenerator 500. 10GE LAN regenerator 500 is a specialized version of a 10GE LAN transceiver 200 that lacks the external client 10GE LAN signals 122*a* and 122*b*. The purpose of the 10GE LAN regenerator 500 is to recover signal 504 from a transport system 100*a* and process the signal in such a way that signal 542 is suitable for retransmission on the next iteration of a transport system 100*b* (see FIG. 5*b*). Going the opposite direction, 10GE LAN regenerator 500 could recover signal 540 from a transport system 100*b* and process the signal in such a way that signal 502 is suitable for retransmission on the next iteration of a transport system 100*a*. In the preferred embodiment, 10GE LAN regenerator 500 includes LOM 400*a* that receives transport system optical signal 504. LOM 400*a* reports measurements on laser drive current, laser bias voltage, and other parameters to micro-controller 350 through line 551. LOM 400*a* converts transport system optical signal 504 into serial electrical 10GE LAN signal 508 and sends serial electrical 10GE LAN signal 508 to De-Mux 512.

De-Mux 512 recovers clock and data information and divides the serial electrical 10GE LAN signal 508 into an intermediate 16-channel wide 10GE LAN signal 526. Status information such as bit error rate (BER) and chip identification are transmitted to micro-controller 350 from De-Mux 512 via line 552 as required to maintain optimal system performance. De-Mux 516 performs a similar function on a Z–A signal as De-Mux 512. De-Mux 516 recovers clock and data information and divides the serial electrical 10GE LAN signal 536 into an intermediate 16-channel wide 10GE LAN signal 532. De-Mux 516 is in communication with micro-controller 350 via line 556 and communicates the same type of status information as De-Mux 512.

In the A–Z direction, intermediate 10GE LAN signal 526 is communicated from De-Mux 512 to FEC 514 where the FEC algorithms recover any data that has been corrupted by the transport system 100*a*. If the data errors exceed the algorithm's limit, FEC 514 notes that the frame's data was unrecoverable and reports the unrecoverable frame error to micro-controller 350 through line 554. FEC 514 transfers the corrected signal 530 to a second FEC 515 where a new set of FEC data is calculated and added to the signal to create a second data signal 534 that incorporates the FEC data. In the Z–A direction, intermediate 10GE LAN signal 532 is communicated from De-Mux 516 to FEC 515 where the FEC algorithms recover any data that has been corrupted by the transport system 100*a*. FEC 515 is in communication with micro-controller 350 through line 555 and uses line 555 to report any unrecoverable frame errors to a signal in the Z–A direction. FEC 515 transfers the corrected signal 528 to FEC 514 where a new set of FEC data is calculated and added to the signal to create a second data signal 524 that incorporates the FEC data.

In the A–Z direction, data signal 534 is sent to Mux 518 and converted into serial data signal 538 and serial clock signal 539. Mux 518 communicates statistics and chip identification codes to micro-controller 350 through line 557. Mux 510 performs a similar function on a Z–A signal as Mux 518. Data signal 524 is sent to Mux 510 and converted into serial data signal 506 and serial clock signal 507. Mux 510 is in communication with micro-controller 350 via line 553 and communicates the same type of status information as Mux 518.

In the A–Z direction, data signal 538 and clock signal 539 are communicated to LOM 400*b* from Mux 518. LOM 400*b* reports measurements on laser drive current, laser bias voltage, and other parameters to micro-controller 350 through line 558. LOM 400*b* converts data signal 538 and clock signal 539 into transport system optical signal 542 for transport over transport system 100*b*. In the Z–A direction, data signal 506 and clock signal 507 are communicated to LOM 400*a* from Mux 510. LOM 400*a* reports measurements on laser drive current, laser bias voltage, and other parameters to micro-controller 350 through line 551. LOM 400*a* converts data signal 506 and clock signal 507 into transport system optical signal 502 for transport over transport system 100*a*.

Returning to FIG. 5*b*, in serial transport system architecture 700, separate 10GE LAN transport systems 701, 702, 703, and 799 are each equipped with a 10GE LAN regenerator 500. The ellipsis in the drawing indicates that there could be any number of reiterations of the architecture between 703 and 799. In architecture 700, in the A–Z direction, 10GE LAN signal 122*a* is received by transceiver 200*a*. Transceiver 200*a* transmits the signal over transport system 100*a* to 10GE LAN regenerator 500*a*. 10GE LAN regenerator 500*a* and *b* may be connected together in series with the transport system 100*b* in order to form a continues signal path for one or more of the 10GE LAN signals. The overall system reach of the system is extended through multiple serially connected 10GE LAN regenerators 500*a* and *b*. After the desired distance is crossed, transceiver 200*y* receives the signal from transport system 100 and pass 10GE LAN signal 122*y* to switch 117*z* as described earlier. Any number of transport systems 100 can be serially interconnected with pairs of regenerators 500*a* and *b*. Just as 10GE LAN regenerators 500*a* and *b* can be serially connected in the A–Z direction, 10GE LAN regenerators 500*a* and *b* can be serially connected in the Z–A direction as is shown in FIG. 5*b*.

The foregoing disclosure and description of the invention are illustrative and explanatory thereof of various changes to the size, shape, materials, components and order may be made without departing from the spirit of the invention.

The invention claimed is:

1. A method for transmitting 10GE LAN signals over a transport system, comprising:
   receiving a 10GE LAN signal from a client device;
   converting the 10GE LAN signal to an intermediate form;
   re-clocking the intermediate signal;
   reconverting the intermediate form to a signal suitable for the transport system;
   transferring the reconverted form of the 10GE LAN signal to the transport systems; and
   monitoring the intermediate form with a monitoring device, wherein the monitoring device is a 10GE LAN media access controller.

2. The method of claim 1, comprising performing forward error correction on the intermediate form.

3. The method of claim 1, wherein the transferring includes transferring the 10GE LAN signal over a metro transport system.

4. The method of claim 1, wherein the transferring includes transferring the 10GE LAN signal over a long haul transport system.

5. The method of claim 1, wherein the transferring includes transferring the 10GE LAN signal over an ultra long haul transport system.

6. The method of claim 1, wherein the transferring includes transferring the 10GE LAN signal over an optical transport system.

7. The method of claim 1, wherein the transferring includes transferring the 10GE LAN signal over a fiber transport system.

8. The method of claim 1, comprising:
   receiving the 10GE LAN signal from the transport system;
   converting the 10GE LAN signal to a second intermediate signal;
   recovering clock data from the second intermediate signal; and
   recovering a data stream from the second intermediate signal.

9. The method of claim 8, wherein the transferring includes transferring the 10GE LAN signal over an inter-office transport system.

10. A method for transferring a 10GE LAN client signal from a transport system to a client system, comprising:
    receiving the 10GE LAN client signal transmitted over the transport system;
    converting the 10GE LAN client signal to an intermediate signal;
    recovering clock data from the intermediate signal;
    recovering a data stream from the intermediate signal;
    reconverting the intermediate signal to the 10GE LAN client signal;
    transferring the 10GE LAN client signal to a client system; and monitoring the intermediate form with a monitoring device, wherein the monitoring device is a 10GE LAN media access controller.

11. The method of claim 10, wherein the received signal is recovered via forward error correction.

12. The method of claim 10, wherein the 10GE LAN client signal transferred over a metro transport system.

13. The method of claim 10, wherein the 10GE LAN client signal transferred over a long haul transport system.

14. The method of claim 10, wherein the 10GE LAN client signal is transferred over an ultra long haul transport system.

15. The method of claim 10, wherein the 10GE LAN client signal is transferred over an optical transport system.

16. The method of claim 10, wherein the transferring includes transferring the 10GE LAN client signal over a fiber transport system.

17. The method of claim 10, wherein the transferring includes transferring the 10GE LAN client signal over an inter-office transport system.

18. An architecture for transporting 10GE LAN signals comprising:
   a first 10GE LAN transceiver;
   a first transport system in communication with the first 10GE LAN transceiver;
   a regenerator operationally connected to the first transport system, wherein the regenerator converts the 10GE LAN signal to an intermediate form;
   a second transport system operationally connected to the regenerator;
   a second 10GE transceiver operationally connected to the second transport system; and a microcontroller operationally connected to the first and second transceiver, the first and second transport system, and the regenerator, wherein the microcontroller controls and obtains performance monitoring data from the intermediate form signal.

19. The architecture of claim 18 wherein the transport system is unidirectional.

20. The architecture of claim 18 wherein the transport system is bi-directional.

21. The architecture of claim 18 further comprising a plurality of transponders wherein a first transponder is operationally connected to the first transport system;
   a second transponder is operationally connected to the second transport system; and
   the first and second transponders are operationally connected to a third transport system.

22. The architecture of claim 18 further comprising the first and second transceiver operationally connected to a combination of transport systems and transceivers in an alternating arrangement.

23. A computer system for regenerating 10GE LAN signals between transport systems, the computer system comprising:
   a first line optics module for communicating with a line signal of a first 10GE LAN transport system;
   a first multiplexer/de-multiplexer coupled to the first line optics module, wherein the first multiplexer/de-multiplexer converts the 10GE LAN signal to an intermediate form;
   a second de-multiplexer/multiplexer coupled to the first multiplexer/de-multiplexer;
   a second line optics module coupled to the second de-multiplexer/multiplexer;
   a second transport system line signal communicating with the second line optics module; and
   a micro controller operationally connected to the first and second multiplexer/de-multiplexers and the first and second line optics modules, wherein the micro controller controls and obtains performance monitoring data from the signal.

24. The computer system of claim 23 further comprising a 10GE LAN signal, wherein the 10GE LAN signal is transmitted at a standard LAN transmission rate.

25. The computer system of claim 23 further comprising the 10GE LAN signal being transmitted at a standard LAN transmission rate with the addition of forward error correction data.

26. The computer system of claim 23 further comprising a media access controller operationally connected to the 10GE LAN signal.

27. The computer system of claim 23 further comprising at least one forward error correcting device operationally connected to the first and second multiplexer/demultiplexers.

28. The computer system of claim 23 further comprising a transceiver for re-clocking the intermediate form.

29. The computer system of claim 28 wherein the transceiver reconverts the intermediate form to a signal suitable for the transport system.

30. The computer system of claim 28 wherein the transceiver transfers the reconverted form of the 10GE LAN signal to the transport system.

* * * * *

UNITED STATES PATENT AND TRADEMARK OFFICE
CERTIFICATE OF CORRECTION

PATENT NO. : 7,164,692 B2  Page 1 of 1
APPLICATION NO. : 10/357606
DATED : January 16, 2007
INVENTOR(S) : Jeffrey Lloyd Cox et al.

It is certified that error appears in the above-identified patent and that said Letters Patent is hereby corrected as shown below:

Column 1,
Line 13, delete "Seth," and insert -- Sheth, --.

Column 11,
Line 67, delete "maybe" and insert -- may be --.

Column 12,
Line 1, delete "426a second" and insert -- 426 a second --.

Column 14,
Line 53, delete "claim 8," and insert -- claim 1, --.

Signed and Sealed this

Sixteenth Day of October, 2007

JON W. DUDAS
*Director of the United States Patent and Trademark Office*